Patented Sept. 5, 1939

2,171,901

UNITED STATES PATENT OFFICE 2,171,901

PROCESS OF VULCANIZING RUBBER

Norman R. Wilson, Belleville, and Arthur J. Lang, Jersey City, N. J., assignors to Rare Metal Products Company, Belleville, N. J., a corporation of New Jersey No Drawing. Application July 3, 1937, Serial No. 151,830

23 Claims. (Cl. 260—780)

This invention relates to rubber vulcanization, and comprises a process of making rubber articles wherein "scorching" of quick-vulcanizing rubber mixes during the milling, storage or molding is prevented by the addition to the mix of certain retarders; and the invention includes, also, such retarders, and the improved rubber products resulting from the use of such process and retarders.

In the manufacture of molded rubber goods the crude rubber is milled with the desired fillers, sulphur and accelerators for vulcanization. Organic accelerators are used, not only to reduce the time of vulcanization, but also to give the vulcanized product physical properties that could not otherwise be obtained. The milling not only produces an intimate mixture of the various ingredients, but also makes the mass plastic and, therefore, moldable. Vulcanization, on the other hand, makes the mass elastic and destroys the plastic properties. The aim of the rubber manufacturer is, therefore, to complete the molding before any appreciable vulcanization has occurred. As the mix includes all the ingredients necessary for vulcanization, it often happens, especially when powerful accelerators are used, that partial vulcanization occurs so early that it interferes with the completion of the molding process. In such cases the mix is said to be "scorched".

Vulcanization of rubber is a chemical reaction with a high temperature coefficient. The temperature of the mix during milling and prior to vulcanization is frequently not greatly below that of vulcanization. If the compound contains a powerful accelerator the temperature coefficient is frequently not high enough to prevent "scorching".

As a result, it is desirable to have a mix which will not vulcanize to any appreciable extent at 200° to 230° F. during the time normally required to mill and mold and which will subsequently vulcanize rapidly at around 275° to 300° F.

In the case of rubber cements, which may not be used for six months or so after preparation, premature vulcanization may occur, even at room temperature.

The object of the present invention is to prevent premature vulcanization in either of these situations, or situations similar thereto.

We have found that a certain class of substances will retard the low temperature (say, below 230° F.) vulcanization of rubber mixes, especially in the case of mixes containing certain types of organic accelerators, without unduly retarding the high temperature vulcanization (around 275° F.). This class of retarders includes the halogens, chlorine, bromine and iodine, and compounds containing such halogens in "available" form, such as hypochlorites and N-chloro compounds. Compounds containing halogens in "available" form are distinguished from the metallic or organic halides by the fact that, in general, the former have oxidizing properties whereas the latter do not; and specifically, the former will liberate either the free halogen or hypohalous acid when treated with an acid as evidenced by the fact that when these are treated with acidified potassium iodide free iodine is liberated; whereas the halides do not liberate iodine when added to acidified potassium iodide. We have found that the compounds containing the halogens in available form produce new and unexpected results as vulcanization retarders. Fluorine and fluorine compounds are not suitable, and for that reason the halogens coming within the scope of this invention are those having an atomic weight over 35.

While the exact reason for the retarding action of halogens is not known, it is believed that vulcanization is a reaction of the chain type and that the halogen continually removes one of the essential elements of the chain so that the reaction velocity is extremely small until all of the halogen has been consumed, when the chain reaction is free to continue in its normal manner and at substantially its normal velocity. Therefore, there is a limit to the amount which should be used. The amount of each of these retarders necessary to give the desired results lies within certain limits which vary according to the other ingredients present in the mix as well as the processing methods and conditions.

In certain rubber compounds there are limitations in the use of certain accelerator combinations to give the desired physical properties in the final product because scorching occurs. The use of a suitable retarder would decrease those limitations. Hence, the use of a retarder not only makes the manufacture of rubber articles more fool-proof, but also makes it possible to obtain a finished product superior to that obtained with the same compound without the retarder.

In the prevention of scorching it is desirable to accomplish that result without deleterious effect on the properties of the rubber after vulcanization. One of the most important properties of rubber goods is the tensile strength of the rubber forming them. We have found that, as regards their effect on the tensile strength of rubber, our retarders may be divided into three main groups:

(1) Hypohalites, such as hypochlorites and like bromine and iodine compounds, both inorganic and organic, and the free halogens, chlorine, bromine and iodine.

(2) N-halo compounds:
    (a) N-halo compounds which are derived by the simple addition of a halogen to, or the substitution by a halogen for one or more of the hydrogen atoms of, an organic compound whose aqueous solution has a pH less than 7.5.
    (b) N-halo compounds which are derived by the simple addition of a halogen to, or the substitution by a halogen for one or more of the hydrogen atoms of, an organic compound whose aqueous solution has a pH more than 7.5.

Some of the retarders of groups (1) and (2—a) when used in amounts sufficient to give really substantial retardation reduce the tensile strength somewhat. Those of group (2—b), on the other hand, do not impair the tensile strength and in some cases even raise it.

While the broad group (2) is divisible as to effect on tensile strength according to the acidic and basic character of the compound from which they are derived, that does not appear to be true of group (1). Thus, those of group (1) formed from basic compounds, like hypohalites, have under some conditions reduced tensile strength. While the exact explanation of this difference between groups (1) and (2) is not known, it is believed to be related to the fact that in hypohalites the halogen is more loosely combined than is generally true of the group (2) compounds, or may be due to poor dispersion of the retarder.

The distinction between groups (2—a) and (2—b) is well illustrated by the following compounds:

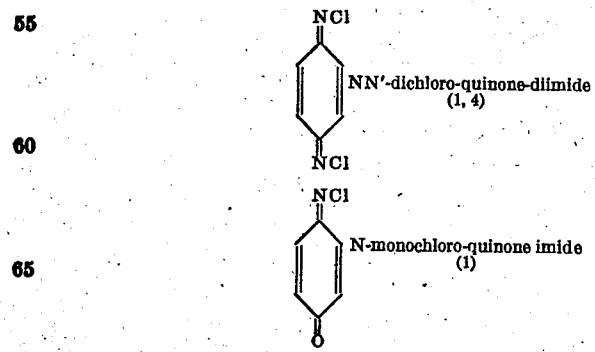

The first of these is derived from a basic compound, while the compound from which the second is derived, owing to its oxygen content, is acidic in character. The first raises or at least does not reduce the tensile strength of the vulcanized rubber, while the second lowers it somewhat.

A second example is given by the following:

N-chloro-melamine—

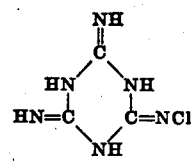

N-N-dichloro-cyanuric acid—

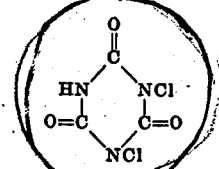

The first is derived from a basic and the second from an acidic product.

One of the most suitable members of group (2—b) is the aliphatic compound NN'-dichloro-azo-dicarbonamidine, $C_2N_6H_4Cl_2$, whose probable structural formula is:

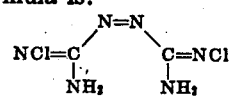

This compound will hereafter be referred to as N. D. A.

Another very satisfactory aliphatic compound is the above mentioned N-chloro melamine or the corresponding dichloro compound.

Among group (2—b) retarders are N-bromo-phthalimide, N-N-di-chloro-quinone-bis-amino-guanidine, and N-chloro-benzamidine.

Other group (2—a) retarders are, chloramine-B, chloramine-T, dichloramine-T, 1,4-N-N-dichlor-diimino-naphtho-quinone-2-sulfonic acid, succin-chlorimide, ethyl-N-chlorimino carbonate, an N-chloro-acetyl urea.

At 220° F. or lower temperatures vulcanization proceeds so slowly with inorganic accelerators of the type of calcium oxide, litharge or magnesia, that it is rarely necessary to use retarders to prevent scorching during milling and molding.

The organic accelerators are much more powerful and it is with them that our retarders find their chief field of usefulness. With these organic accelerators our retarders work best with certain types of accelerators.

For the purposes of the present invention, the organic accelerators now in use may be divided into two main groups:

(1) Those which contain a —SH or either a —S— or —S—S— group, formed by substitution in or condensation of a mercaptan.

(2) Those which do not.

Most of those accelerators included in group (1) may be subdivided as follows:

1—A. Salts of thio acids, such as zinc butyl-xanthogenate and dinitro-phenyl ester of dimethyl-dithio-carbamic acid. Two of the simplest acids of this group are dithio-carbamic acid, $NH_2$—CS—SH, and xanthic acid,

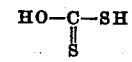

1—B. Mercapto-thiazoles, or mercaptan derivatives of

     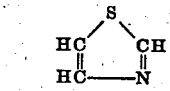

Thio ortho monazole.    Thio meta monazole.

Accelerators of this group include mercaptobenzo-thiazole and its zinc and other salts, and benzo-thiazyl-thio-benzoate.

1—C. Thiazines, such as 2-thioketo, 3-phenyl, 4,5-dipropyl, 6-propylidene, 3,6-dihydro, 1,3-thiazine.

1—D. Disulphides obtained from mercaptans including in their composition the group —S—S—, such as benzo-thiazyl-disulphide.

Similarly the majority of those in group (2) may be subdivided as follows:

2—A. Thioureas, such as thio-carbanilide or diphenyl-thiourea.

2—B. Aldehyde-ammonia condensation products, such as hexamethylene-tetramine.

2—C. Aldehyde amines, such as the reaction product of butyl-aldehyde and aniline, the condensation product of butyr-aldehyde and mono-butyl-amine, heptaldehyde-aniline and para-tolyidine-acetaldehyde-aniline condensation product.

2—D. Guanidines, such as diphenyl-guanidine or di-ortho-tolyl-guanidine.

2—E. Thiurams, such as tetra-methyl-thiuram-mono-sulphide,

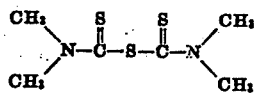

and tetra-methyl-thiuram-disulphide,

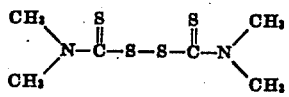

Some accelerators belong to two or more of the above groups. This is true of the accelerator known to the trade as "Acrin", which is the condensation product of hexamethylene (type 2—B) and benzyl-chloride-mercapto-benzo-thiazole (type 1—B). Similarly, "El-Sixty" belongs to both types 2—A and 1—B, being dibenzyl-thiazyl-dimethyl-thiourea.

With retarders of the type of calcium hypochlorite a marked retarding effect has been obtained with accelerators of all the above types. With a very few members of the above groups, such as the condensation product of butyr-aldehyde and mono-butyl-amine of group 2—C, the retarding effect under the conditions of test was negligible. In no case, using calcium hypochlorite, was low-temperature vulcanization accelerated.

It is believed that with hypochlorites there is a retarding effect in all cases, although in some instances it may be neutralized by an accelerating effect produced by the decomposition products of the hypochlorite. The accelerators with which the retarding effect was negligible were all relatively slow acting, so that the activating effect of the decomposition products of the hypochlorite would be greater than in the case of the more rapidly acting accelerators.

With N. D. A., effective retardation occurs only with accelerators of group (1), so that it is more specific than the hypochlorites. The cause of this difference in action between hypochlorites and N. D. A. is not known. It is believed, however, that N. D. A on giving up its chlorine yields an amino compound which activates accelerators of group (2) more strongly than do the corresponding products of hypochlorites. Hence, with accelerators of the group (2) types used alone, N. D. A. produces an acceleration effect greater than the retarding effect due to the chlorine. However, that does not appear to be true where a group (2) accelerator is used in conjunction with a group (1) accelerator to give a much greater acceleration than can be obtained by either accelerator alone. For example, N. D. A. has been found to have a marked retarding effect in the case of the combination of any of the following accelerators of group (2) with mercapto-benzo-thiazole of group 1—B:

2—A. Thio-carbanilide,
2—B. Hexa-methylene-tetramine,
2—C. Acetaldehyde-amine,
2—D. Dihenyl-guanidine,
2—E. Tetra-methyl-thiuram-disulphide, although with accelerators of the types 2—A, etc., alone, N. D. A. activates instead of retarding. Where accelerators of both groups are used, as in the above examples, the additional activating effect of the amino compound seems to be so reduced that the retarding effect of the chlorine outweighs the activating effect of the amino compound. In other words, the activating effect of the amino compound on a given accelerator seems to be less when the action of the latter is already activated by another accelerator.

As a class, halogens of atomic weight over 35 and compounds containing such halogens in available form appear to act as retarders in the case of all of the above types of organic accelerators, although in some cases it is necessary to add another type of accelerator to overcome the tendency of the decomposition products of the retarder to activate low-temperature vulcanization.

As an example of a suitable mix using N. D. A. as the retarder, the following is given.

| | |
|---|---|
| Pale crepe | 100 |
| Cliffstone whiting | 100 |
| Zinc oxide | 5.0 |
| Antimony sulphide | 10.0 |
| Sulphur | 2 |
| Benzo thiazyl disulphide | 1.0 |
| Diphenyl guanidine | 0.125 |
| N. D. A. | 0.25 |

The above mix can be subjected to temperatures of about 230° F. or thereabouts for 35 to 40 minutes before scorching occurs.

The relationship between the content of retarder and the length of time the above mix may be maintained at 230° F. or thereabouts before it begins to scorch is indicated by the following illustrative table:

| | Percentage | Time |
|---|---|---|
| | | *Minutes* |
| N. D. A | 0.0 | About 5 |
| | 0.1 | About 10 |
| | 0.2 | About 30 |
| | 0.3 | About 70 |

There is some slowing up of the time at which vulcanization begins at around 287°, as shown by the following illustrative table:

| | Percentage | Time |
|---|---|---|
| | | *Minutes* |
| N. D. A | 0.0 | About 2 |
| | 0.1 | About 3 |
| | 0.2 | About 4 |
| | 0.3 | About 6 |

The above figures are purely illustrative and with different accelerators, retarders, temperatures, etc., widely different numerical results will be obtained.

It is characteristic of our retarders that they substantially completely inhibit vulcanization for a time, after which vulcanization proceeds at a rapid rate, instead of permitting vulcanization to begin almost immediately at a reduced rate.

The retarder, such as alkaline earth hypochlorite, may be added to a batch of rubber in a mill before adding the accelerator, sulphur, etc., either in the proportions required for the final product or in higher proportions to form a master-mix containing, say, 10% of calcium hypochlorite without accelerator, sulphur, etc. The resulting mix or master-mix likewise has little or no chlorine odor and appears to contain chlorine in combination with the rubber in a form available for acting as a low-temperature vulcanization retarder, without materially affecting vulcanization at 275° to 300° F. This master-mix or chlorinated rubber may be added to the other constituents of the final mix in such proportion as to give one-tenth to one part of calcium hypochlorite to each 100 parts of pure dry rubber, or such other proportion as may be desired in the final mix.

Organic hypochlorites, such as butyl hypochlorite, may be used. Several of such compounds, such as butyl hypochlorite, are too volatile to incorporate in the usual milling operations. They may, however, be added to rubber cements or latex or similar rubber suspensions and thereafter exert their retarding action. The same applies to alkali hypochlorites which are too unstable to be added in dry form to a rubber mix.

When the free halogens, chlorine, bromine and iodine, are used, they may be added in the form of a carbon tetrachloride solution to a solution of rubber in benzene, containing vulcanizing ingredients, in the proportion of around 0.2 to 0.25 percent of the halogen on the dry weight of rubber.

The free halogens or hypochlorites may also be added to latex or other aqueous suspension of rubber to produce a chlorinated rubber which may be used as a retarder in the preparation of rubber mixes.

What is claimed is:

1. The process of treating rubber which comprises subjecting a rubber mix containing an organic accelerator and a halogen with an atomic weight over 35 in available form, to conditions which would tend to cause a greater degree of scorching in the absence of said halogen, and then subjecting it to vulcanizing temperature.

2. The process of making rubber articles, comprising adding to a rubber mix an organic accelerator and a halogen with an atomic weight over 35 in available form to retard the action of the accelerator at milling temperatures, milling the mix to render it plastic, molding the plastic milled material to the desired form, and then subjecting it to vulcanizing temperature.

3. The process of making rubber articles, comprising adding to a rubber mix an organic accelerator and an N-halo compound of a halogen with an atomic weight over 35 in available form to retard the action of the accelerator at milling temperatures, milling the mix to render it plastic, molding the plastic milled material to the desired form, and then subjecting it to vulcanizing temperature.

4. The process of making rubber articles, comprising adding to a rubber mix an organic accelerator and an N-chloro derivative of an organic compound which contains chlorine in available form and whose aqueous solution has a pH more than 7.5 to retard the action of the accelerator at milling temperatures, milling the mix to render it plastic, molding the plastic milled material to the desired form, and then subjecting it to vulcanizing temperature.

5. The process of making rubber articles, comprising adding to a rubber mix an organic accelerator and an N-chloro derivative of an aliphatic organic compound which contains chlorine in available form and whose aqueous solution has a pH more than 7.5 to retard the action of the accelerator at milling temperatures, milling the mix to render it plastic, molding the plastic milled material to the desired form, and then subjecting it to vulcanizing temperature.

6. The process of making rubber articles, comprising adding to a rubber mix an organic accelerator and a derivative of melamine containing available chlorine to retard the action of the accelerator at milling temperatures, milling the mix to render it plastic, molding the plastic milled material to the desired form, and then subjecting it to vulcanizing temperature.

7. The process of making rubber articles, comprising adding to a rubber mix an organic accelerator and a hypochlorite to retard the action of the accelerator at milling temperatures, milling the mix to render it plastic, molding the plastic milled material to the desired form, and then subjecting it to vulcanizing temperature.

8. The process of making rubber articles, comprising adding to a rubber mix an organic accelerator and calcium hypochlorite to retard the action of the accelerator at milling temperatures, milling the mix to render it plastic, molding the plastic milled material to the desired form, and then subjecting it to vulcanizing temperature.

9. The process of making rubber articles, comprising adding to a rubber mix an accelerator selected from the class consisting of compounds containing the groups —SH and —S— and compounds containing the groups —SH and —S—S— derived from a mercaptan, and an N-chloro compound containing chlorine in available form to retard the action of the accelerator at milling temperatures, milling the mix to render it plastic, molding the plastic milled material to the desired form, and then subjecting it to vulcanizing temperature.

10. The process of making rubber articles, comprising adding to a rubber mix an accelerator selected from the class consisting of compounds containing the groups —SH and —S— and compounds containing the groups —SH and —S—S— derived from a mercaptan, and NN'-dichloro azo dicarbonamidine to retard the action of the accelerator at milling temperatures, milling the mix to render it plastic, molding the plastic milled material to the desired form, and then subjecting it to vulcanizing temperature.

11. The process of making rubber articles, comprising adding to a rubber mix an accelerator of the thio acid salt type and NN'-dichloro azo dicarbonamidine to retard the action of the accelerator at milling temperatures, milling the mix to render it plastic, molding the plastic milled material to the desired form, and then subjecting it to vulcanizing temperature.

12. The process of making rubber articles, comprising adding to a rubber mix an accelerator of the mercapto thiazole type and NN'-dichloro-azo-dicarbonamidine to retard the action of the accelerator at milling temperatures, milling the mix to render it plastic, molding the plastic milled material to the desired form, and then subjecting it to vulcanizing temperature.

13. The process of making rubber articles, comprising adding to a rubber mix an accelerator of the mercapto thiazole type and an accelerator of the di-substituted guanadine type and a halogen with an atomic weight over 35 in available form to retard the action of the accelerator at milling temperatures, milling the mix to render it plastic, molding the plastic milled material to the desired form, and then subjecting it to vulcanizing temperature.

14. The process of making rubber articles, comprising adding to a rubber mix an accelerator of the thiazine type and NN'-dichloro-azo-dicarbonamidine to retard the action of the accelerator at milling temperatures, milling the mix to render it plastic, molding the plastic milled material to the desired form, and then subjecting it to vulcanizing temperature.

15. A rubber vulcanization retarder, comprising a halogen with an atomic weight over 35 in available form.

16. A rubber vulcanization retarder, comprising an N-chloro derivative of an organic compound containing chlorine in available form and whose aqueous solution has a pH more than 7.5.

17. A rubber vulcanization retarder, comprising an N-chloro derivative of an aliphatic organic compound containing chlorine in available form and whose aqueous solution has a pH more than 7.5.

18. A rubber vulcanization retarder, comprising NN'-dichloro-azo-dicarbonamidine.

19. A rubber vulcanization retarder, comprising a derivative of melamine containing available chlorine.

20. A rubber vulcanization retarder, comprising a hypochlorite.

21. A rubber product obtained by subjecting a mix containing an organic accelerator and a halogen with an atomic weight over 35 in available form, to conditions which would tend to cause a greater degree of scorching in the absence of said available halogen and subsequently vulcanizing the mix.

22. A rubber product which has been vulcanized in the presence of an organic accelerator and a hypochlorite.

23. A rubber product which has been vulcanized in the presence of an organic accelerator and an N-chloro derivative of an organic compound containing chlorine in available form and whose solution has a pH more than 7.5.

NORMAN R. WILSON.
ARTHUR J. LANG.